United States Patent
Kousaka et al.

(10) Patent No.: US 11,021,563 B2
(45) Date of Patent: Jun. 1, 2021

(54) METHOD FOR PRODUCING RESIN FOR OPTICAL COMPONENT, RESIN FOR OPTICAL COMPONENT, SPECTACLE LENS, AND SPECTACLES

(71) Applicant: HOYA LENS THAILAND LTD., Pathumthani (TH)

(72) Inventors: Masahisa Kousaka, Shinjuku-ku (JP); Takeaki Iryo, Tanauan (PH)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

(21) Appl. No.: 16/366,719

(22) Filed: Mar. 27, 2019

(65) Prior Publication Data
US 2019/0218331 A1  Jul. 18, 2019

Related U.S. Application Data

(63) Continuation of application No. PCT/JP2018/036477, filed on Sep. 28, 2018.

(30) Foreign Application Priority Data

Sep. 29, 2017 (JP) .............................. JP2017-192164

(51) Int. Cl.
| | |
|---|---|
| C08G 18/38 | (2006.01) |
| C08G 18/76 | (2006.01) |
| C08J 7/06 | (2006.01) |
| D06P 3/72 | (2006.01) |
| G02B 1/04 | (2006.01) |
| C09B 6/00 | (2006.01) |
| C09B 67/22 | (2006.01) |
| C08G 18/24 | (2006.01) |
| D06P 1/20 | (2006.01) |

(52) U.S. Cl.
CPC ....... *C08G 18/3876* (2013.01); *C08G 18/242* (2013.01); *C08G 18/7642* (2013.01); *C08J 7/065* (2013.01); *C09B 6/00* (2013.01); *C09B 67/0033* (2013.01); *C09B 67/0038* (2013.01); *D06P 3/72* (2013.01); *G02B 1/04* (2013.01); *G02B 1/041* (2013.01); *C08J 2375/04* (2013.01); *D06P 1/20* (2013.01)

(58) Field of Classification Search
CPC ........ C08G 18/12; C08G 18/72; C08G 18/10; G02B 1/041; B29D 11/00009; C08J 5/00
See application file for complete search history.

(56) References Cited

U.S. PATENT DOCUMENTS

| | | | |
|---|---|---|---|
| 8,378,140 B2 | 2/2013 | Stutz et al. | |
| 10,144,796 B2 | 12/2018 | Iijima | |
| 2003/0144452 A1* | 7/2003 | Jallouli | ................ G02B 1/041 |
| | | | 528/44 |
| 2003/0182738 A1* | 10/2003 | Pyles | ..................... D06P 1/613 |
| | | | 8/536 |
| 2014/0107314 A1 | 4/2014 | Kawato et al. | |
| 2014/0296431 A1* | 10/2014 | Kousaka | ................ C08G 18/73 |
| | | | 524/710 |

FOREIGN PATENT DOCUMENTS

| | | | |
|---|---|---|---|
| CN | 103842399 A | | 6/2014 |
| EP | 0630927 | * | 7/2009 |
| JP | H02-036216 A | | 2/1990 |
| JP | H07-033851 A | | 2/1995 |
| JP | H10-045700 A | | 2/1998 |
| JP | H10-186101 A | | 7/1998 |
| JP | 2008-143872 A | | 6/2008 |
| JP | 2009-051838 A | | 3/2009 |
| JP | 2014-055229 A | | 3/2014 |
| KR | 10-2014-0015525 A | | 2/2014 |
| WO | 2016/153061 A1 | | 9/2016 |

OTHER PUBLICATIONS

Jan. 8, 2019 International Search Report issued in International Patent Application PCT/JP2018/036477.

* cited by examiner

*Primary Examiner* — Gregory Listvoyb
(74) *Attorney, Agent, or Firm* — Oliff PLC

(57) ABSTRACT

An embodiment of the present disclosure relates to a method for producing an optical component resin having excellent dyeability, an optical component resin, a spectacle lens, and spectacles. A method for producing an optical component resin, including a step of polymerizing a polymerizable composition containing a polyisocyanate component and a polythiol component containing 40 mol % or more of a polythiol compound having two or more sulfide bonds in a molecular structure thereof, in which the content of a hydrolyzable chlorine compound contained in the polyisocyanate component is in a range of 10 ppm by mass or more and 100 ppm by mass or less in the polyisocyanate component, an optical component resin obtained by the producing method, an optical component formed of the optical component resin, a spectacle lens including a lens substrate formed of the optical component resin, and spectacles including the spectacle lens.

13 Claims, No Drawings

METHOD FOR PRODUCING RESIN FOR OPTICAL COMPONENT, RESIN FOR OPTICAL COMPONENT, SPECTACLE LENS, AND SPECTACLES

TECHNICAL FIELD

The present disclosure relates to a method for producing an optical component resin used for a spectacle lens or the like, an optical component resin, a spectacle lens, and spectacles.

BACKGROUND ART

A resin lens is lighter than a lens formed of an inorganic material such as inorganic glass, is hard to crack, and can be dyed advantageously. Therefore, it is currently the mainstream to use a resin lens as an optical component such as a spectacle lens or a camera lens.

Patent Literature 1 discloses an optical high refractive index plastic lens formed of a sulfur-containing polyurethane obtained by polymerizing at least one polyisocyanate compound and two or more polythiols and/or sulfur-containing polyol compounds, containing a specific dithiol compound as an essential component of polythiol, and having a refractive index of 1.59 or more and a thermal deformation temperature of 95° C. or higher. Patent Literature 1 describes that the plastic lens has high heat resistance without being deformed in thermal history in a post-processing step of the lens and has highly excellent dyeability.

CITATION LIST

Patent Literature

Patent Literature 1: JP H10-186101 A

SUMMARY

Technical Problem

However, in a conventional plastic lens containing a polymer of a polyisocyanate component and a polythiol component, such as the plastic lens disclosed in the above Patent Literature 1, a dyeing density sometimes does not rise depending on a production lot. Therefore, even in a case of further performing dyeing in the same dyeing tank in order to correct the dyeing density, it is necessary to adjust dyeing conditions for each production lot in order to accurately correct a color tone, and productivity decreases.

When a urethane resin obtained by polymerizing a polyisocyanate component and a polythiol component uses a polythiol compound having two or more sulfide bonds in a molecular structure thereof as the polythiol component for increasing a refractive index or the like, the obtained urethane resin is hydrophobic as compared with a conventional resin, and a network structure of the resin is dense. Therefore, a dye hardly permeates the urethane resin, and it is difficult to dye the urethane resin.

An embodiment of the present disclosure relates to a method for producing an optical component resin having excellent dyeability, an optical component resin, a spectacle lens, and spectacles.

Solution to Problem

The present inventor has found that in an optical component resin containing a polymer of a polyisocyanate component and a polythiol component containing 40 mol % or more of a polythiol compound having two or more sulfide bonds in a molecular structure thereof, the content of a hydrolyzable chlorine compound of the polyisocyanate component affects dyeability of the optical component resin.

An embodiment of the present disclosure relates to a method for producing an optical component resin, including a step of polymerizing a polymerizable composition containing a polyisocyanate component and a polythiol component containing 40 mol % or more of a polythiol compound having two or more sulfide bonds in a molecular structure thereof, in which the content of a hydrolyzable chlorine compound contained in the polyisocyanate component is in a range of 10 ppm by mass or more and 100 ppm by mass or less in the polyisocyanate component.

In addition, an embodiment of the present disclosure relates to an optical component resin which is a polymer of a polyisocyanate component and a polythiol component containing 40 mol % or more of a polythiol compound having two or more sulfide bonds in a molecular structure thereof, in which the content of a hydrolyzable chlorine compound contained in the polyisocyanate component is in a range of 10 ppm by mass or more and 100 ppm by mass or less in the polyisocyanate component.

Advantageous Effects

An embodiment of the present disclosure can provide a method for producing an optical component resin having excellent dyeability, an optical component resin, a spectacle lens, and spectacles.

DESCRIPTION OF EMBODIMENTS

[Method for Producing Optical Component Resin]

A method for producing an optical component resin according to an embodiment of the present disclosure includes a step of polymerizing a polymerizable composition containing a polyisocyanate component and a polythiol component containing 40 mol % or more of a polythiol compound having two or more sulfide bonds in a molecular structure thereof.

The content of a hydrolyzable chlorine compound contained in the polyisocyanate component is in a range of 10 ppm by mass or more and 100 ppm by mass or less in the polyisocyanate component.

With the above configuration, an optical component resin having excellent dyeability can be obtained.

The method for producing an optical component resin according to an embodiment of the present disclosure includes: for example, a step of mixing a polythiol component, a polyisocyanate component, and an ultraviolet absorber to obtain a polymerizable composition (hereinafter also referred to as "mixing step");

a step of degassing the polymerizable composition (hereinafter also referred to as "degassing step");

a step of injecting the polymerizable composition into a molding die (hereinafter also referred to as "injection step")

a step of polymerizing the polymerizable composition (hereinafter also referred to as "polymerization step"); and a step of dyeing the obtained optical component resin after the polymerization step (hereinafter also referred to as "dyeing step").

(Content of Hydrolyzable Chlorine Compound Contained in Polyisocyanate Component)

The "hydrolyzable chlorine compound" is a compound that reacts with methanol to generate hydrogen chloride.

In the method for producing an optical component resin according to an embodiment of the present disclosure, the content of a hydrolyzable chlorine compound contained in a polyisocyanate component (hereinafter also simply referred to as "content of hydrolyzable chlorine compound") is 10 ppm by mass or more and 100 ppm by mass or less in the polyisocyanate component from a viewpoint of obtaining an optical component resin having excellent dyeability.

The content of the hydrolyzable chlorine compound may be 20 ppm by mass or more, 30 ppm by mass or more, 60 ppm by mass or more, or 75 ppm by mass or more, and 98 ppm by mass or less, 95 ppm by mass or less, 92 ppm by mass or less, 90 ppm by mass or less, 88 ppm by mass or less, or 85 ppm by mass or less in the polyisocyanate component from a viewpoint of obtaining a plastic lens having better dyeability.

The content of the hydrolyzable chlorine compound may be 20 ppm by mass or more and 98 ppm by mass or less, 30 ppm by mass or more and 95 ppm by mass or less, 60 ppm by mass or more and 92 ppm by mass or less, 75 ppm by mass or more and 90 ppm by mass or less, 75 ppm by mass or more and 88 ppm by mass or less, or 75 ppm by mass or more and 85 ppm by mass or less in the polyisocyanate component from a viewpoint of obtaining a plastic lens having better dyeability The content of the hydrolyzable chlorine compound contained in the polyisocyanate component is measured by a measuring method described in Examples.

As a method for adjusting the content of the hydrolyzable chlorine compound in the polyisocyanate component, for example, the content of the hydrolyzable chlorine compound can be decreased by repeated distillation of the polyisocyanate component.

<Mixing Step>

In a case of mixing a polythiol component, a polyisocyanate component, and an additive, the polythiol component, the polyisocyanate component, and the additive may be mixed in any order in the mixing step. However, in some embodiments, the polyisocyanate component and the additive (i) may be mixed, and then the resulting mixture may be mixed with the polythiol component (ii) from a viewpoint of further enhancing transparency of the optical component.

In (i), the polyisocyanate component generally has low viscosity and good solubility, and therefore the additive is easily dissolved therein. In (i), in order to shorten dissolution time, it may be to add and dissolve the entire amount of the additive to the total amount of the polyisocyanate component.

[Polymerizable Composition]

The polymerizable composition obtained in the mixing step contains a polythiol component, a polyisocyanate component, and an additive. Each of the components will be described below.

(Polyisocyanate Component)

Examples of the polyisocyanate component include a polyisocyanate compound having an aromatic ring, an alicyclic polyisocyanate compound, and a linear or branched aliphatic polyisocyanate compound.

Examples of the polyisocyanate compound having an aromatic ring include diisocyanatobenzene, 2,4-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-methylene bis(phenyl isocyanate), 4,4'-methylene bis(2-methyl phenyl isocyanate), bibenzyl-4,4'-diisocyanate, bis(isocyanatophenyl) ethylene, 1,3-bis(isocyanatomethyl) benzene, 1,4-bis(isocyanatomethyl) benzene, 1,3-bis(isocyanatoethyl) benzene, bis(isocyanatopropyl) benzene, α,α,α',α'-tetramethylxylylene diisocyanate, bis(isocyanatobutyl) benzene, bis(isocyanatomethyl) naphthalene, bis(isocyanatomethylphenyl) ether, 2-isocyanatophenyl-4-isocyanatophenyl sulfide, bis(4-isocyanatophenyl) sulfide, bis(4-isocyanatomethylphenyl) sulfide, bis(4-isocyanatophenyl) disulfide, bis(2-methyl-5-isocyanatophenyl) disulfide, bis(3-methyl-5-isocyanatophenyl) disulfide, bis(3-methyl-6-isocyanatophenyl) disulfide, bis(4-methyl-5-isocyanatophenyl) disulfide, bis(3-methyloxy-4-isocyanatophenyl) disulfide, and bis(4-methyloxy-3-isocyanatophenyl) disulfide.

Examples of the alicyclic polyisocyanate compound include 1,3-diisocyanatocyclohexane, isophorone diisocyanate, 1,3-bis(isocyanatomethyl) cyclohexane, 1,4-bis(isocyanatomethyl) cyclohexane, dicyclohexylmethane-4,4'-diisocyanate, 2,5-bis(isocyanatomethyl)-bicyclo[2.2.1]heptane, 2,6-bis(isocyanatomethyl)-bicyclo[2.2.1]heptane, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane.

Examples of the linear or branched aliphatic polyisocyanate compound include hexamethylene diisocyanate, 2,2-dimethylpentane diisocyanate, 2,2,4-trimethylhexane diisocyanate, butenediisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanate 4-isocyanatomethyloctane, bis(isocyanatoethyl) carbonate, bis(isocyanatoethyl) ether, lysine diisocyanatomethyl ester, lysine triisocyanate, bis(isocyanatomethyl) sulfide, bis(isocyanatoethyl) sulfide, bis(isocyanatopropyl) sulfide, bis(isocyanatohexyl) sulfide bis(isocyanatomethyl) sulfone, bis(isocyanatomethyl) disulfide, bis(isocyanatoethyl) disulfide, bis(isocyanatopropyl) disulfide, bis(isocyanatomethylthio) methane, bis(isocyanatoethylthio) methane, bis(isocyanatomethylthio) ethane, bis(isocyanatoethylthio) ethane, 1,5-diisocyanate 2-isocyanatomethyl-3-pentane, 1,2,3-tris(isocyanatomethylthio) propane, 1,2,3-tris(isocyanatoethylthio) propane, 3,5-dithia-1,2,6,7-heptane tetraisocyanate, 2,6-diisocyanatomethyl-3,5-dithia-1,7-heptane diisocyanate, 2,5-diisocyanatomethylthiophene, 4-isocyanatoethylthio-2,6-dithia-1,8-octanediisocyanate, 1,2-diisothiocyanatoethane, and 1,6-diisothiocyanatohexane.

One kind or two or more kinds of polyisocyanate compounds may be used.

The polyisocyanate component may contain at least one selected from the group consisting of 2,5-bis(isocyanatomethyl)-bicyclo[2.2.1]heptane, 2,6-bis(isocyanatomethyl)-bicyclo[2.2.1]heptane, 1,3-bis(isocyanatomethyl) cyclohexane, 1,3-bis(isocyanatomethyl) benzene, 1,4-bis(isocyanatomethyl) benzene, dicyclohexylmethane-4,4'-diisocyanate, and isophorone diisocyanate, more preferably contains at least one selected from the group consisting of 1,3-bis(isocyanatomethyl) benzene, 2,5-bis(isocyanatomethyl)-bicyclo[2.2.1]heptane, 2,6-bis(isocyanatomethyl)-bicyclo[2.2.1]heptane, and 1,3-bis(isocyanatomethyl) cyclohexane, still more preferably contains 1,3-bis(isocyanatomethyl) benzene.

The addition amount of the polyisocyanate component may be 40% by mass or more, 43% by mass or more, or 45% by mass or more, and 60% by mass or less, 55% by mass or less, or 53% by mass or less with respect to the total amount of the polythiol component and the polyisocyanate component.

The addition amount of the polyisocyanate component may be 40% by mass or more and 60% by mass or less, 43% by mass or more and 55% by mass or less, or 45% by mass or more and 53% by mass or less with respect to the total amount of the polythiol component and the polyisocyanate component.

(Polythiol Component)

The polythiol component contains 40 mol % or more of a polythiol compound having two or more sulfide bonds in a molecular structure thereof.

The number of sulfide bonds in the molecular structure of the polythiol compound is 2 or more. The number of sulfide bonds in the structure may be 3 or more, and 5 or less, or 4 or less.

Example of the polythiol compound having two or more sulfide bonds in a molecular structure thereof include 4-mercaptomethyl-1,8-dimercapto-3,6-dithiaoctane, 4,7-bis(mercaptomethyl)-3,6,9-trithia-1,11-undecanedithiol, 4,8-bis(mercaptomethyl)-3,6,9-trithia-1,11-undecanedithiol, 5,7-bis(mercaptomethyl)-3,6,9-trithia-1,11-undecanedithiol, 1,1,3,3-tetrakis(mercaptomethylthio) propane, 1,1,3,3-tetrakis(mercaptoethylthio) propane, 1,1,2,2-tetrakis(mercaptomethylthio) ethane, 1,1,2,2-tetrakis(mercaptoethylthio) ethane, 3-mercaptomethyl-1,5-dimercapto-2,4-dithiapentane, tris(mercaptomethylthio) methane, bis(mercaptomethylthio) methane, bis(2-mercaptoethylthio) methane, 1,2-bis(mercaptomethylthio) ethane, 1,2-bis(2-mercaptoethylthio) ethane, 1,3-bis(mercaptomethylthio) propane, 1,3-bis(2-mercaptoethylthio) propane, tetrakis(mercaptoethylthio) propane, bis(2-mercaptoethyl) disulfide, bis(2-mercaptoethylthio)-3-mercaptopropane, 2-(2,2-bis(mercaptomethylthio) ethyl)-1,3-dithietane, 2,5-bis(mercaptomethyl)-1,4-dithiane, and 4,6-bis(mercaptomethyl)-1,3-dithiane.

Among these compounds, 4,7-bis(mercaptomethyl)-3,6,9-trithia-1,11-undecanedithiol, 4,8-bis(mercaptomethyl)-3,6,9-trithia-1,11-undecanedithiol, and 5,7-bis(mercaptomethyl)-3,6,9-trithia-1,11-undecanedithiol may be used in some embodiments.

The refractive index of the polythiol compound having two or more sulfide bonds in a molecular structure thereof is, for example, 1.62 or more or 1.63 or more from a viewpoint of remarkably obtaining the above mentioned effect, and the upper limit thereof is not particularly limited. However, the refractive index is, for example, 1.70 or less, 1.68 or less, or 1.65 or less.

The refractive index of the polythiol compound having two or more sulfide bonds in a molecular structure thereof may be, for example, 1.62 or more and 1.70 or less, 1.63 or more and 1.68 or less, or 1.63 or more and 1.65 or less from a viewpoint of remarkably obtaining the above effect.

The refractive index of the polythiol compound is measured by a method described in Examples.

The content of the polythiol compound having two or more sulfide bonds in a molecular structure thereof is 40 mol % or more. It may be 50 mol % or more, 70 mol % or more, 80 mol % or more, or 90 mol % or more, and for example, 100 mol % or less in the polythiol component.

The polythiol component may contain another polythiol compound different from the polythiol compound having two or more sulfide bonds in a molecular structure thereof. Examples of the other polythiol compound include a polythiol compound having one sulfide bond or no sulfide bond in a molecular structure thereof (hereinafter also referred to as "another polythiol compound").

Examples of the other polythiol compound include:

a linear or branched aliphatic polythiol compound having one sulfide bond or no sulfide bond in a molecular structure thereof (hereinafter also referred to as "another linear or branched aliphatic polythiol compound");

an ester compound of a polyol compound and a mercapto group-containing carboxylic acid compound, having one sulfide bond or no sulfide bond in a molecular structure thereof (hereinafter also referred to as "another ester compound");

a polythiol compound having an alicyclic structure, having one sulfide bond or no sulfide bond in a molecular structure thereof (hereinafter referred to as "another polythiol compound having an alicyclic structure"); and an aromatic polythiol compound having one sulfide bond or no sulfide bond in a molecular structure thereof (hereinafter referred to as "another aromatic polythiol compound").

Examples of the other linear or branched aliphatic polythiol compound include 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 2,2-dimethylpropane-1,3-dithiol, 3,4-dimethyloxybutane-1,2-dithiol, 2,3-dimercapto-1-propanol, 1,2-dimercaptopropyl methyl ether, 2,3-dimercaptopropyl methyl ether, 2-(2-mercaptoethylthio) propane-1,3-dithiol, 2,2-bis(mercaptomethyl)-1,3-propanedithiol, bis(2-mercaptoethyl) ether, and bis(2-mercaptoethyl) sulfide.

In the ester compound of a polyol compound and a mercapto group-containing carboxylic acid compound, examples of the polyol compound include a compound having two or more hydroxy groups in a molecule thereof.

Examples of the polyol compound include ethylene glycol, diethylene glycol, propanediol, propanetriol, butanediol, trimethylolpropane, bis(2-hydroxyethyl) disulfide, pentaerythritol, and dipentaerythritol.

Examples of the mercapto group-containing carboxylic acid compound include thioglycolic acid, mercaptopropionic acid, a thiolactic acid compound, and thiosalicylic acid.

Examples of an ester compound of another polyol compound and a mercapto group-containing carboxylic acid compound include ethylene glycol bis(2-mercaptoacetate), ethylene glycol bis(2-mercaptopropionate), diethylene glycol bis(2-mercaptoacetate), diethylene glycol bis(2-mercaptopropionate), 1,4-butanediol bis(2-mercaptoacetate), 1,4-butanediol bis(3-mercaptopropionate), trimethylolpropane tris(2-mercapto acetate), trimethylolpropane tris(3-mercaptopropionate), pentaerythritol tetrakis(2-mercaptoacetate), pentaerythritol tetrakis(2-mercaptopropionate), pentaerythritol tetrakis(3-mercaptopropionate) dipentaerythritol hexakis(2-mercaptoacetate), and dipentaerythritol hexakis(3-mercaptopropionate).

Examples of the other polythiol compounds having an alicyclic structure include 1,1-cyclohexanedithiol, 1,2-cyclohexanedithiol, methylcyclohexanedithiol, and bis(mercaptomethyl) cyclohexane.

Examples of the other aromatic polythiol compound include 1,3-dimercaptobenzene, 1,4-dimercaptobenzene, 1,3-bis(mercaptomethyl) benzene, 1,4-bis(mercaptomethyl) benzene, 1,3-bis(mercaptoethyl) benzene, 1,4-bis(mercaptoethyl) benzene, 1,3,5-trimercaptobenzene, 1,3,5-tris(mercaptomethyl) benzene, 1,3,5-tris(mercaptoethyl) benzene, 4,4'-dimercaptobiphenyl, 4,4'-dimercaptobibenzyl, 2,5-toluenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methyloxyphenyl) propane-2,2-dithiol, 1,3-diphenylpropane-2,2-dithiol, phenyl methane-1,1-dithiol, and 2,4-di(p-mercaptophenyl) pentane.

These polythiol compounds may be used singly or in combination of two or more kinds thereof.

Among these compounds, the other polythiol compound may include at least one elected from the group consisting of pentaerythritol tetrakis(2-mercaptoacetate), pentaerythritol tetrakis(3-mercaptopropionate), trimethylolpropane tris(2-mercaptoacetate), trimethylolpropane tris(3-mercaptopropionate), butanediol bis(2-mercaptoacetate), butanediol bis(3-mercaptopropionate), dipentaerythritol hexakis(2-mercaptoacetate), and dipentaerythritol hexakis(3-mercaptopropionate), more preferably includes at least one selected from the group consisting of pentaerythritol tetrakis(3-mercaptopropionate), 2,5-bis(mercaptomethyl)-1,4-dithiane, and pentaerythritol tetrakis(2-mercaptoacetate).

The content of the other polythiol compound may be 60 mol % or less, 50 mol % or less, 30 mol % or less, 20 mol % or less, or 10 mol % or less, for example, 0 mol % or more in the polythiol component.

The addition amount of the polythiol component may be 40% by mass or more, 43% by mass or more, or 45% by mass or more, and 60% by mass or less, 55% by mass or less, or 50% by mass or less with respect to the total amount of the polythiol component and the polyisocyanate component.

The addition amount of the polythiol component may be 40% by mass or more and 60% by mass or less, 43% by mass or more and 55% by mass or less, or 45% by mass or more and 50% by mass or less with respect to the total amount of the polythiol component and the polyisocyanate component.

Examples of a combination of the polythiol component and the polyisocyanate component include:

(1) 1,3-bis(isocyanatomethyl) benzene, 4,7-bis(mercaptomethyl)-3,6,9-trithia-1,11-undecanedithiol, 4,8-bis(mercaptomethyl)-3,6,9-trithia-1,11-undecanedithiol, and 5,7-bis (mercaptomethyl)-3,6,9-trithia-1,11-undecanedithiol, (2) 1,3-bis(isocyanatomethyl) benzene and 4-mercaptomethyl-1,8-dimercapto-3,6-dithiaoctane, (3) 2,5-bis(isocyanatomethyl) bicyclo[2.2.1]heptane, 2,6-bis(isocyanatomethyl) bicyclo[2.2.1]heptane, 4-mercaptomethyl-1,8-dimercapto-3,6-dithiaoctane, and pentaerythritol tetrakis(3-mercaptopropionate), and (4) 1,3-bis(isocyanatomethyl) cyclohexane, 2,5-bis(mercaptomethyl)-1,4-dithiane, and pentaerythritol tetrakis(2-mercaptoacetate).

(Additive)

Examples of the additive include a polymerization catalyst, a release agent, an ultraviolet absorber, an antioxidant, a coloring inhibitor, and a fluorescent whitening agent. One kind or two or more kinds of these additives may be used.

The additive preferably contains at least one selected from the group consisting of a polymerization catalyst, a release agent, and an ultraviolet absorber.

By mixing the above various components by a usual method, an optical component resin is obtained.

(Polymerization Catalyst)

Examples of the polymerization catalyst include a tin compound and a nitrogen-containing compound.

Examples of the tin compound include an alkyl tin compound and an alkyl tin halide compound.

Examples of the alkyl tin compound include dibutyl tin diacetate and dibutyl tin dilaurate.

Examples of the alkyl tin halide compound include dibutyl tin dichloride, dimethyl tin dichloride, monomethyl tin trichloride, trimethyl tin chloride, tributyl tin chloride, tributyl tin fluoride, and dimethyl tin dibromide.

Among these compounds, dibutyl tin diacetate, dibutyl tin dilaurate, dibutyl tin dichloride, and dimethyl tin dichloride are preferable, and dimethyl tin dichloride may be used in some embodiments.

Examples of the nitrogen-containing compound include a tertiary amine, a quaternary ammonium salt, an imidazole-based compound, and a pyrazole-based compound. The tertiary amine is preferably a hindered amine.

Examples of the tertiary amine include triethylamine, tri-n-propylamine, triisopropylamine, tri-n-butylamine, triisobutylamine, N,N-dimethylbenzylamine, N-methylmorpholine, N,N-dimethylcyclohexylamine, pentamethyldiethylenetriamine, bis(2-dimethylaminoethyl) ether, N-methylmorpholine, N,N'-dimethylpiperazine, N,N,N',N'-tetramethylethylenediamine, and 1,4-diazabicyclo[2.2.2]octane (DABCO).

Examples of the hindered amine include 1,2,2,6,6-pentamethyl-4-piperidinol, 1,2,2,6,6-pentamethyl-4-hydroxyethyl-4-piperidinol, methyl-1,2,2,6,6-pentamethyl-4-piperidyl sebacate, a mixture of methyl-1,2,2,6,6-pentamethyl-4-piperidyl sebacate and bis(1,2,2,6,6-pentamethyl-4-piperidyl) sebacate, bis(1,2,2,6,6-pentamethyl-4-piperidyl) sebacate, bis(2,2,6,6-tetramethyl-1-(octyloxy)-4-piperidyl) sebacate, bis(1,2,2,6,6-pentamethyl-4-piperidyl) [[3,5-bis(1,1-dimethylethyl)-4-hydroxyphenyl] methyl] butyl malonate, and tetrakis(1,2,2,6,6-pentamethyl-4-piperidyl) butane-1,2,3,4-tetracarboxylate.

Examples of the quaternary ammonium salt include tetraethylammonium hydroxide.

Examples of the imidazole-based compound include imidazole, 1,2-dimethylimidazole, benzylmethylimidazole, and 2-ethyl-4-imidazole.

Examples of the pyrazole-based compound include pyrazole and 3,5-dimethylpyrazole.

Among these compounds, the tertiary amine such as a hindered amine, the imidazole-based compound, and the pyrazole-based compound may be used in some embodiments, and the hindered amine may be used in another some embodiments.

The addition amount of the polymerization catalyst may be 0.001 parts by mass or more, 0.005 parts by mass or more, or 0.007 parts by mass or more, and 2 parts by mass or less, 1 part by mass or less, or 0.5 parts by mass or less with respect to 100 parts by mass of the total amount of the polythiol component and the polyisocyanate component.

The addition amount of the polymerization catalyst may be 0.001 parts by mass or more and 2 parts by mass or less, 0.005 parts by mass or more and 1 part by mass or less, or 0.007 parts by mass or more and 0.5 parts by mass or less with respect to 100 parts by mass of the total amount of the polythiol component and the polyisocyanate component.

(Ultraviolet Absorber)

Examples of the ultraviolet absorber include a benzotriazole-based compound, a benzophenone-based compound, and a dibenzoylmethane-based compound. Among these compounds, the benzotriazole-based compound and the benzophenone-based compound may be used in some embodiments.

Examples of the benzotriazole-based compound include 2-(2-hydroxy-5-methylphenyl)-2H-benzotriazole, 2-(2-hydroxy-3,5-di-tert-butylphenyl)-5-chloro-2H-benzotriazole, 2-(3-t-butyl-2-hydroxy-5-methylphenyl)-5-chloro-2H-benzotriazole, 2-(2-hydroxy-3,5-di-tert-amylphenyl)-2H-benzotriazole, 2-(2-hydroxy-3,5-di-tert-butylphenyl)-2H-benzotriazole, 2-(2-hydroxy-5-tert-butylphenyl)-2H-benzotriazole, 2-(2-hydroxy-5-octylphenyl)-2H-benzotriazole, 2-(2-hydroxy-4-ethyloxyphenyl)-2H-benzotriazole, 2-(2-hydroxy-4-propyloxyphenyl)-2H-benzotriazole, 2-(2-hydroxy-4-octyloxyphenyl)-2H-benzotriazole, and 2-(2-hydroxy-4-octyloxyphenyl)-5-chloro-2H-benzotriazole. Note that 2-(2-hydroxy-5-octylphenyl)-2H-benzotriazole is preferably 2-(2-hydroxy-5-tert-octylphenyl)-2H-benzotriazole.

Note that the tert-octyl group means a 1,1,3,3-tetramethylbutyl group.

Examples of the benzophenone-based compound include 2,4-dihydroxybenzophenone, 2-hydroxy-4-methyloxybenzophenone, 2-hydroxy-4-methyloxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, and 2,2'-dihydroxy-4-methyloxybenzophenone.

Examples of the dibenzoylmethane-based compound include 4-tert-butyl-4'-methyloxydibenzoylmethane.

One kind or two or more kinds of these compounds may be used.

The addition amount of the ultraviolet absorber may be 0.1 parts by mass or more, 0.3 parts by mass or more, or 0.4 parts by mass or more, and 2 parts by mass or less, 1.5 parts by mass or less, or 1.2 parts by mass or less with respect to 100 parts by mass of the total amount of the polythiol component and the polyisocyanate component from a viewpoint of more remarkably obtaining the above effect.

The addition amount of the ultraviolet absorber may be 0.1 parts by mass or more and 2 parts by mass or more or less, 0.3 parts by mass or more and 1.5 parts by mass or less, or 0.4 parts by mass or more and 1.2 parts by mass or less with respect to 100 parts by mass of the total amount of the polythiol component and the polyisocyanate component from a viewpoint of more remarkably obtaining the effect of the present invention.

(Release Agent)

Examples of the release agent include an acidic alkyl phosphate. The number of carbon atoms in an alkyl group of the acidic alkyl phosphate may be 1 or more, or 4 or more, and 20 or less, or 12 or less.

The acidic alkyl phosphate may be either a phosphoric monoester or a phosphoric diester, but a mixture of a phosphoric monoester and a phosphoric diester may be used in some embodiments.

Examples of the acidic alkyl phosphate include isopropyl acid phosphate, butyl acid phosphate, octyl acid phosphate, nonyl acid phosphate, decyl acid phosphate, isodecyl acid phosphate, tridecyl acid phosphate, stearyl acid phosphate, propylphenyl acid phosphate, butylphenyl acid phosphate, and butoxyethyl acid phosphate.

The addition amount of the release agent may be 0.01 parts by mass or more, 0.05 parts by mass or more, or 0.10 parts by mass or more, and 1.00 part by mass or less, 0.50 parts by mass or less, or 0.30 parts by mass or less with respect to 100 parts by mass of the total amount of the polythiol component and the polyisocyanate component.

The addition amount of the release agent may be 0.01 parts by mass or more and 1.00 part by mass or less, 0.05 parts by mass or more and 0.50 parts by mass or less, or 0.10 parts by mass or more and 0.30 parts by mass or less with respect to 100 parts by mass of the total amount of the polythiol component and the polyisocyanate component.

<Degassing Step>

The polymerizable composition obtained in the mixing step may be treated in a degassing step.

Degassing is performed, for example, by treating the polymerizable composition under reduced pressure.

The pressure during degassing may be 10 Pa or more, 50 Pa or more, or 100 Pa or more, and 1000 Pa or less, 800 Pa or less, or 500 Pa or less.

The pressure during degassing may be 10 Pa or more and 1000 Pa or less, 50 Pa or more and 800 Pa or less, or 100 Pa or more and 500 Pa or less.

<Injection Step>

In the injection step, for example, the obtained polymerizable composition is injected into a molding die.

In a case where a spectacle lens is produced as an optical component, for example, a molding die including a pair of molds to form both main surfaces of the spectacle lens and a tape or a gasket having an adhesive layer on one side thereof for fixing these molds with a predetermined gap is used. The above-described mold may be formed of glass, ceramic, resin, or metal.

Prior to injection into the molding die, the polymerizable composition may be filtered. A filtration method is not particularly limited, but filtration may be performed using a filter having a pore diameter of 1 to 30 μm.

<Polymerization Step>

In the polymerization step, for example, the polymerizable composition is polymerized by heating.

Polymerization conditions may be set depending on the polymerizable composition and the shape of an optical component to be formed.

The polymerization initiation temperature and time may be from 0 to 50° C., or from 5 to 30° C., and 0.5 to 5.0 hours. The temperature is raised from the polymerization initiation temperature, and then heating may be performed to perform curing formation. For example, the maximum temperature after being raised is from 110 to 130° C.

After completion of the polymerization, the optical component may be released from a die and may be annealed.

By the above-described method, an optical component resin is obtained.

The glass transition temperature (Tg) of the optical component resin may be 80° C. or higher, 90° C. or higher, or 100° C. or higher, and 140° C. or lower, 130° C. or lower, 120° C. or lower, or 110° C. or lower.

The glass transition temperature (Tg) of the optical component resin may be 80° C. or higher and 140° C. or lower, 90° C. or higher and 130° C. or lower, 100° C. or higher and 120° C. or lower, or 100° C. or higher and 110° C. or lower.

The glass transition temperature (Tg) is measured by a method described in Examples.

<Dyeing Step>

In the dyeing step, the obtained optical component resin is dyed after the polymerization step.

In the dyeing step, for example, the optical component resin is immersed in a dyeing solution containing a dye.

Examples of the dye used in an immersion dyeing method include an oil soluble dye and a disperse dye. Among these dyes, the disperse dye may be used in some embodiments. Examples of the disperse dye include disperse dyes of an anthraquinone-based dye, an azo-based dye, and a quinoline-based dye. Among these dyes, the anthraquinone-based dye may be used in some embodiments. These dyes may be used singly or in combination of two or more kinds thereof such that the optical component resin can be dyed in a desired color.

The content of the dye in the dyeing solution is preferably 1 g/L or more and 10 g/L or less.

The dyeing solution preferably further contains a surfactant.

Examples of the surfactant include an alkylbenzene sulfonate, an alkyl sulfosuccinate, a lauryl sulfate, a polyoxyethylene alkyl ether, a polyoxyethylene sorbitan fatty acid ester, and a polyoxyethylene stearylphenol ether sulfonate. One kind or two or more kinds of these compounds may be used.

A carrier for promoting dyeing may be added to the dyeing solution.

Examples of the carrier include an alcohol having an aromatic ring, a phenol-based compound, a naphthalene-based compound, a benzophenone-based compound, and an aromatic compound containing a halogen atom.

Examples of the alcohol having an aromatic ring include benzyl alcohol and cinnamyl alcohol.

Examples of the phenol-based compound include o-phenylphenol and p-phenylphenol.

Examples of the naphthalene-based compound include methylnaphthalene.

Examples of the aromatic compound containing a halogen atom include monochlorobenzene, o-dichlorobenzene, m-dichlorobenzene, 1,2,4-trichlorobenzene, 1,2,5-trichlorobenzene, 1,3,5-trichlorobenzene, 1,2,3-trichlorobenzene, tetrachlorobenzene, pentachlorobenzene, hexachlorobenzene, monochloronaphthalene, and dichloronaphthalene. One kind or two or more kinds of these compounds may be used.

The dyeing temperature and time may be appropriately set depending on a desired coloring density.

When it is difficult to perform dyeing by an immersion dyeing method, dyeing may be performed by a pressure dyeing method, a dye film heating method, a sublimation dyeing method, or the like.

[Optical Component]

Examples of applications of the optical component resin include a spectacle lens, a camera lens, a prism, an optical fiber, a recording medium substrate used for an optical disc or a magnetic disk, and an optical component such as an optical filter attached to a display of a computer. Among these applications, the spectacle lens may be used in some applications.

The spectacle lens may include a lens substrate formed of an optical component resin (hereinafter also referred to as "spectacle lens substrate").

The surface shape of the spectacle lens substrate is not particularly limited and may be a flat surface, a convex surface, a concave surface, or the like.

The spectacle lens substrate may be a single focus lens, a multifocal lens, a progressive addition lens, or the like. For example, as one example, in the progressive addition lens, usually, a near portion area (near portion) and a corridor area (intermediate area) are included in a lower area, and a distance portion area (distance portion) is included in an upper area.

The spectacle lens substrate may be a finish type spectacle lens substrate or a semi finish type spectacle lens substrate.

The diameter of the spectacle lens substrate is not particularly limited, but is usually about 50 to 100 mm.

The thickness of the geometric center of the spectacle lens substrate is not particularly limited, but is usually about 0.8 to 30 mm.

The refractive index (ne) of the spectacle lens substrate is, for example, 1.53 or more, 1.55 or more, 1.58 or more, or 1.60 or more, and the upper limit thereof is not particularly limited. However, as the refractive index is higher, a lens may have a thinner thickness.

The Abbe number (ve) of the spectacle lens substrate is, for example, 20 or more, 25 or more, 30 or more, or 35 or more, and the upper limit thereof is not particularly limited. However, as the Abbe number is higher, a lens has a smaller a chromatic aberration.

The spectacle lens may include a spectacle lens substrate and a functional layer on a surface of the spectacle lens substrate.

As the functional layer, for example, at least one selected from the group consisting of a hard coat layer, a primer layer, an antireflection film, and a water repellent film may be used.

The hard coat layer is disposed for improving scratch resistance, and may be formed by applying a coating solution containing a fine particulate inorganic material such as an organic silicon compound, tin oxide, silicon oxide, zirconium oxide, or titanium oxide.

The primer layer is disposed for improving impact resistance, and contains, for example, polyurethane as a main component. Here, the content of polyurethane may be 50% by mass or more in the primer layer.

Examples of the antireflection film include a film obtained by laminating an inorganic material such as silicon oxide, titanium dioxide, zirconium oxide, or tantalum oxide.

The water repellent film may be formed using an organic silicon compound containing a fluorine atom.

The light transmittance of the spectacle lens in a wavelength range of 400 to 700 nm is preferably 70% or more, more preferably 80% or more, still more preferably 85% or more, and 100% or less.

The light cutting ratio of the spectacle lens in a wavelength of 380 nm may be 40% or more, 50% or more, 60% or more, 70% or more, or 80% or more, and 100% or less.

[Spectacles]

Spectacles according to an embodiment of the present invention include a spectacle lens and a frame in which the spectacle lens is mounted.

The frame includes, for example, a pair of rims, a bridge disposed between the rims, and a pair of temples each disposed at one end of each of the rims.

The rims may be half rims.

The frame may be a so-called rimless frame. In this case, for example, the spectacles include a pair of spectacle lenses, a bridge disposed between the spectacle lenses, and a pair of temples each disposed at one end of each of the spectacle lenses.

EXAMPLES

Hereinafter, specific Examples will be described concerning an embodiment of the present disclosure, but the present claims are not limited by the following Examples.

Methods for measuring and evaluating various physical properties were performed by the following methods.

[Measuring Method and Evaluating Method]

<Content of Hydrolyzable Chlorine Compound in Isocyanate Component>

Measurement was performed according to Plastic Polyurethane Raw Material Aromatic Isocyanate Test Method Part 3: Method for Determining Hydrolyzable Chlorine specified in JIS K1603-3: 2007.

<Refractive Index of Polythiol Compound>

The refractive index of a polythiol compound was measured with helium d-line (587.6 nm) at 25° C. using a refractometer "RA-600" (manufactured by Kyoto Electronics Industry Co., Ltd.).

$n_d$ is a refractive index measured with d-line.

<Refractive Index and Abbe Number of Lens>

The refractive index of a plastic lens was measured with F' line (488.0 nm), C' line (643.9 nm), and e line (546.1 nm) at 20° C. using a precision refractive index meter "KPR-2000 type" (manufactured by Kalnew Optical Industrial Co., Ltd.). The Abbe number was calculated from the following formula.

$$\text{Abbe number } v_e = (n_e - 1)/(n_{F'} - n_{C'})$$

$n_e$ indicates a refractive index measured with e line. $n_{F'}$ indicates a refractive index measured with F' line. $n_{C'}$ indicates a refractive index measured with C' line.

<Glass Transition Temperature (Tg)>

Measurement was performed using a thermomechanical analyzer "Thermo Plus EVO2" (manufactured by Rigaku Corporation) by a penetration method (sample thickness: 3 mm, pin diameter: 0.5 mm, weight: 10 g, temperature rising rate: 10° C./min). A peak temperature at which thermal expansion was changed was taken as glass transition temperature (Tg).

<Dyeing Density>

The light transmittance of a sample at a wavelength of 550 nm was measured using a high-speed integrating sphere spectral transmittance measuring instrument "DOT-3" (manufactured by Murakami Color Research Laboratory Co., Ltd.), and the dyeing density (%) was calculated using the following formula (2). As the dyeing density was higher, dyeing was performed at a higher density.

$$\text{Dyeing density}(\%) = 100(\%) - \text{light transmittance}(\%) \text{ at 550 nm} \quad (2)$$

[Method for Adjusting Content of Hydrolyzable Chlorine Compound in Isocyanate Component]

Each of the isocyanate components used in Examples and Comparative Examples was distilled repeatedly until the content of the hydrolyzable chlorine compound reached a predetermined content to adjust the content of the hydrolyzable chlorine compound.

Example 1

(Production of Spectacle Lens Substrate)

50.60 parts by mass of 1,3-bis(isocyanatomethyl) benzene (content of hydrolyzable chlorine compound: 70 ppm by mass) as a polyisocyanate component, 0.012 parts by mass of dimethyltin dichloride as a polymerization catalyst, 0.15 parts by mass of an acidic phosphate "JP506H" (butoxyethyl acid phosphate manufactured by Johoku Chemical Co., Ltd. (mixture of compounds each having one or two butoxyethyl groups as substituents)) as a release agent, and 0.45 parts by mass of 2-(2-hydroxy-4-octyloxyphenyl)-2H-benzotriazole "Seesorb 707" (manufactured by Shipro Kasei Kaisha, Ltd.) as an ultraviolet absorber were added. The resulting mixture was stirred until various additives were dissolved sufficiently. Thereafter, 49.40 parts by mass of a mixture of 4,7-bis(mercaptomethyl)-3,6,9-trithia-1,11-undecanedithiol, 4,8-bis(mercaptomethyl)-3,6,9-trithia-1,11-undecanedithiol, and 5,7-bis(mercaptomethyl)-3,6,9-trithia-1,11-undecanedithiol (refractive index $n_d$=1.64) was added as a polythiol component and mixed to obtain a polymerizable composition.

This polymerizable composition was degassed at 300 Pa for 45 minutes and then filtered with a polytetrafluoroethylene (PTFE) filter having a pore diameter of 3 μm. Subsequently, the polymerizable composition was injected into a molding die including a glass mold to form a spectacle lens substrate having a lens power D of 0.00 and a center thickness of 2.00 mm and a gasket. The molding die into which the polymerizable composition had been injected was gradually heated from 10° C. to 120° C. over 20 hours and further kept at 120° C. for two hours for polymerization.

After polymerization, the resulting product was removed from the molding die to obtain a spectacle lens substrate having a lens power D of 0.00 and a center thickness of 2.00 mm. The obtained spectacle lens substrate was annealed at 120° C. for two hours. The refractive index, the Abbe number, and the Tg of the obtained spectacle lens substrate were measured. Results thereof are illustrated in Table 1.

(Dyeing of Spectacle Lens Substrate)

One liter of pure water in a beaker was kept at 96° C. using an indirect bath while being stirred with a stirrer. Then, to the pure water being kept warm in the beaker, 5 mL of cinnamyl alcohol as a dyeing carrier, 5 mL of 2-ethylhexyl sodium sulfate (40% by mass aqueous solution) "Sintrex EH-R" (manufactured by NOF corporation) as a surfactant, and 1.5 mL of polyoxyethylene stearylphenol ether sulfonate (35% by mass aqueous solution) "Neonol 20" (manufactured by Seiken Kako Co., Ltd.) were added. Then, 2.00 g of a blue dye "FSP Blue AUL-S" (anthraquinone-based disperse dye manufactured by Futaba Sangyo Co., Ltd.) as a disperse dye, 0.35 g of a red dye "FSP Red E-A" (anthraquinone-based disperse dye manufactured by Futaba Sangyo Co., Ltd.), 0.85 g of a yellow dye "FSP Yellow FL" (manufactured by Futaba Sangyo Co., Ltd.), and 1.60 g of a brown dye "FSP Red S-N" (manufactured by Futaba Sangyo Co., Ltd.) were added. Then, the aqueous solution in the beaker was stirred for 60 minutes or more using a stirrer, and each additive was uniformly dispersed and dissolved to prepare a dyeing solution. Incidentally, during preparation of the dyeing solution, the dyeing solution was kept warm such that the liquid temperature thereof was kept constant at 96° C. all the time.

A spectacle lens substrate was immersed in the dyeing solution at 96° C. for 170 seconds to perform dyeing. Then, the dyeing density was measured. Results thereof are illustrated in Table 1.

Examples 2 and 3 and Comparative Example 1

A spectacle lens substrate was obtained in a similar manner to Example 1 except that a polyisocyanate component having the content of a hydrolyzable chlorine compound illustrated in Table 1 was used. The refractive index, the Abbe number, the Tg, and the dyeing density of the obtained spectacle lens substrate were measured. Results thereof are illustrated in Table 1.

TABLE 1

| | | Example 1 | Example 2 | Example 3 | Comparative Example 1 |
|---|---|---|---|---|---|
| Content of hydrolyzable chlorine (ppm by mass) *1 | | 70 | 80 | 87 | 460 |
| Physical properties | Refractive index (ne) | 1.67 | 1.67 | 1.67 | 1.67 |
| | Abbe number (Ve) | 31 | 31 | 31 | 31 |
| | Tg (° C.) | 104 | 104 | 104 | 104 |
| Dyeing density (%) | | 42.3 | 43.0 | 42.2 | 40.1 |

*1: Content of hydrolyzable chlorine in polyisocyanate component (ppm by mass)

Comparison between Examples 1 to 3 and Comparative Example 1 indicates that excellent dyeability is obtained when the content of a hydrolyzable chlorine compound contained in the polyisocyanate component is in a range of 10 ppm by mass or more and 100 ppm by mass or less in the polyisocyanate component.

Finally, the embodiment of the present disclosure will be summarized.

An embodiment of the present disclosure is a method for producing an optical component resin, including a step of polymerizing a polymerizable composition containing a polyisocyanate component and a polythiol component containing 40 mol % or more of a polythiol compound having two or more sulfide bonds in a molecular structure thereof, in which the content of a hydrolyzable chlorine compound contained in the polyisocyanate component is in a range of 10 ppm by mass or more and 100 ppm by mass or less in the polyisocyanate component.

An Example described above can provide an optical component resin or the like having excellent dyeability.

The embodiment disclosed here is exemplary in all respects, and it should be considered that the embodiment is not restrictive. The scope of the present invention is defined not by the above description but by claims, and intends to include all modifications within meaning and a scope equal to claims.

The invention claimed is:

1. A method for producing an optical component resin, comprising
   a step of polymerizing a polymerizable composition containing a polyisocyanate component and a polythiol component containing 40 mol % or more of a polythiol compound having two or more sulfide bonds in a molecular structure thereof, wherein
   a hydrolyzable chlorine compound contained in the polyisocyanate component has a content in a range of 10 ppm by mass or more and 100 ppm by mass or less in the polyisocyanate component.

2. The method for producing an optical component resin according to claim 1, wherein the polythiol compound has a refractive index of 1.62 or more and 1.70 or less.

3. The method for producing an optical component resin according to claim 1, wherein the polyisocyanate component contains 1,3-bis(isocyanatomethyl) benzene.

4. The method for producing an optical component resin according to claim 1, wherein the polythiol compound contains 4,7-bis(mercaptomethyl)-3,6,9-trithia-1,11-undecanedithiol, 4,8-bis(mercaptomethyl)-3,6,9-trithia-1,11-undecanedithiol, and 5,7-bis(mercaptomethyl)-3,6,9-trithia-1,11-undecanedithiol.

5. The method for producing an optical component resin according to claim 1, further comprising a step of dyeing an obtained optical component resin after the polymerization step.

6. The method for producing an optical component resin according to claim 5, wherein the dyeing step is performed by immersing the optical component resin in a dyeing solution containing a dye.

7. The method for producing an optical component resin according to claim 6, wherein the dye is a disperse dye.

8. The method for producing an optical component resin according to claim 7, wherein the disperse dye contains an anthraquinone-based dye.

9. An optical component resin which is a polymer of a polyisocyanate component and a polythiol component containing 40 mol % or more of a polythiol compound having two or more sulfide bonds in a molecular structure thereof, wherein
   a hydrolyzable chlorine compound contained in the polyisocyanate component has a content in a range of 10 ppm by mass or more and 100 ppm by mass or less in the polyisocyanate component.

10. An optical component comprising the optical component resin according to claim 9.

11. A spectacle lens comprising a lens substrate formed of the optical component resin according to claim 9.

12. The spectacle lens according to claim 11, wherein the lens substrate is dyed.

13. Spectacles comprising the spectacle lens according to claim 11.

* * * * *